(12) United States Patent
Smith

(10) Patent No.: US 9,063,943 B1
(45) Date of Patent: Jun. 23, 2015

(54) SYSTEMS AND METHODS FOR CALCULATING A UNIQUENESS RATING FOR A VEHICLE

(75) Inventor: Arthur Quentin Smith, Fredericksburg, TX (US)

(73) Assignee: United Services Automotive Association, San Antonio, TX (US)

( * ) Notice: Subject to any disclaimer, the term of this patent is extended or adjusted under 35 U.S.C. 154(b) by 0 days.

(21) Appl. No.: 13/304,096

(22) Filed: Nov. 23, 2011

Related U.S. Application Data

(60) Provisional application No. 61/417,129, filed on Nov. 24, 2010.

(51) Int. Cl.
*G06F 17/30* (2006.01)
(52) U.S. Cl.
CPC .... *G06F 17/30106* (2013.01); *G06F 17/30533* (2013.01); *G06F 17/30424* (2013.01)
(58) Field of Classification Search
USPC .................................................. 707/748, 758
See application file for complete search history.

(56) References Cited

U.S. PATENT DOCUMENTS

| | | | | |
|---|---|---|---|---|
| 5,673,338 | A * | 9/1997 | Denenberg et al. | 382/209 |
| 2003/0187714 | A1* | 10/2003 | Perry et al. | 705/10 |
| 2008/0195435 | A1* | 8/2008 | Bentley et al. | 705/7 |
| 2008/0249857 | A1* | 10/2008 | Angell et al. | 705/14 |
| 2010/0185509 | A1* | 7/2010 | Higgins et al. | 705/14.49 |

OTHER PUBLICATIONS

E46Fanatics, "Determining your car's uniqueness", Jan. 4, 2010, pp. 1-2.*

* cited by examiner

*Primary Examiner* — Son T Hoang
(74) *Attorney, Agent, or Firm* — Baker & Hostetler LLP

(57) ABSTRACT

Systems and methods for calculating a uniqueness rating for a vehicle may include a user preference module to receive user preference data for calculating a uniqueness rating of a vehicle, the user preference data comprising a social media preference that indicates a number of levels to traverse of a user's social graph; a retrieval module to retrieve vehicle characteristics for a set of vehicles in the user's social graph based on the social media preference; a calculation module to calculate the uniqueness rating for the vehicle based on a comparison between characteristics of the vehicle and the vehicle characteristics in the set of vehicles; and a presentation module to present the uniqueness rating to the user based on the user preference data.

24 Claims, 8 Drawing Sheets

YOUR VEHICLE IS 85% UNIQUE

YOUR VEHICLE CHARACTERISTICS WERE:

MAKE: CAR COMPANY ONE
MODEL: SPORT
COLOR: RED

WITHIN THE VEHICLES SEARCHED YOUR
CHARACTERISTICS WERE FOUND:

MAKE: CAR COMPANY ONE 10%
MODEL: SPORT 5%
COLOR: RED 18%

WITHIN THE VEHICLES SEARCHED, THE
MOST COMMON CHARACTERISTICS WERE :

MAKE: CAR COMPANY TWO 30%
MODEL: SEDAN 40%
COLOR: GRAY 25%

*FIG. 8*

SYSTEMS AND METHODS FOR CALCULATING A UNIQUENESS RATING FOR A VEHICLE

CLAIM OF PRIORITY

This application claims the benefit of priority under 35 U.S.C. §119(e) to U.S. Provisional Patent Application Ser. No. 61/417,129, filed on Nov. 24, 2010, the benefit of priority of which is claimed hereby, and of which is incorporated by reference herein in its entirety.

BACKGROUND

When a consumer chooses to purchase a vehicle he or she takes into account many objective and subjective factors. Objective factors may include mileage, cost, and safety while subjective factors may include styling, perceived value, and practicality. Often times consumers also ask friends and family for input on what vehicle to purchase.

SUMMARY

Systems and methods for calculating a uniqueness rating for a vehicle are described. In an embodiment, a system comprises a user preference module configured to receive user preference data for calculating a uniqueness rating of a vehicle, the user preference data comprising a social media preference that indicates a number of levels to traverse of a user's social graph. The system further comprises a retrieval module configured to retrieve vehicle characteristics for a set of vehicles in the user's social graph based on the social media preference. The system further comprises a calculation module configured to calculate the uniqueness rating for the vehicle based on a comparison between characteristics of the vehicle and the vehicle characteristics in the set of vehicles. Also, the system comprises a presentation module configured to present the uniqueness rating to the user based on the user preference data.

In an embodiment, a system comprises a memory coupled to a processor, the memory including instructions, which when executed by the processor, cause the processor to receive user preference data for calculating a uniqueness rating of a vehicle; retrieve vehicle characteristics for a set of vehicles; calculate the uniqueness rating for the vehicle based on a comparison between characteristics of the vehicle and the vehicle characteristics of the set of vehicles; and present the uniqueness rating to the user based on the user preference data.

In an embodiment, a system comprises a memory coupled to a processor, the memory including instructions, which when executed by the processor, cause the processor to receive user preference data for calculating a uniqueness rating of a vehicle, the user preference data comprising search demographics data and search area data; retrieve vehicle characteristics for a set of vehicles, the set of vehicles having drivers with demographics identified in the search demographic data, and the set of vehicles located in a search area identified by the search area data; calculate the uniqueness rating for the vehicle based on a comparison between characteristics of the vehicle and the vehicle characteristics of the set of vehicles; and present the uniqueness rating to a user based on the user preference data This summary is intended to provide an overview of subject matter of the present patent application. It is not intended to provide an exclusive or exhaustive explanation. The Detailed Description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 8 is an example user interface according to various embodiments.

DETAILED DESCRIPTION

Figure 1:
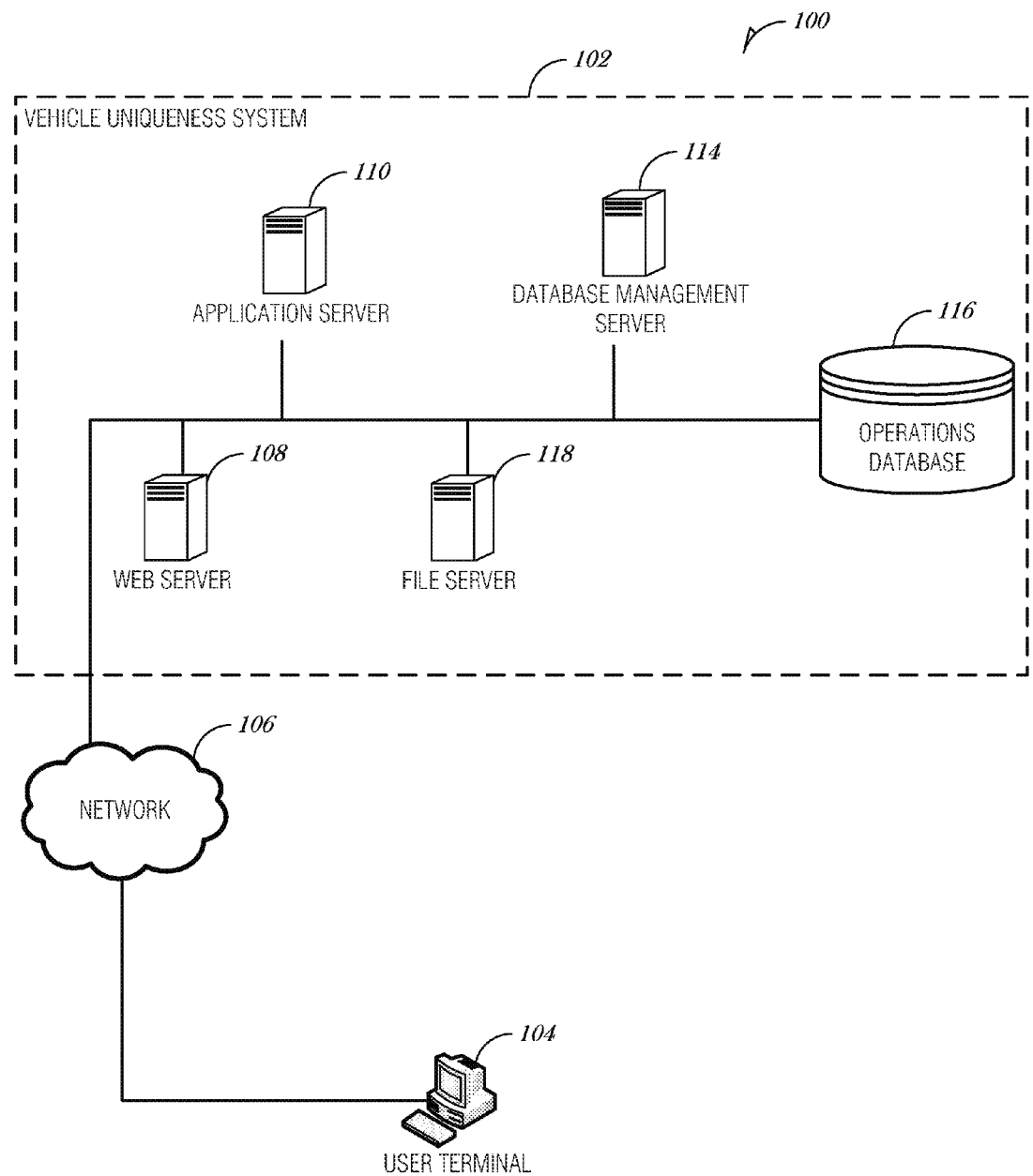
FIG. 1 is a schematic view illustrating a computer network system according to various embodiments.

The following detailed description includes references to the accompanying drawings, which form a part of the detailed description. The drawings show, by way of illustration, example embodiments. These embodiments, which are also referred to herein as "examples," are described in enough detail to enable those skilled in the art to practice aspects of the inventive subject matter.

In this document, the terms "a" or "an" are used, as is common in patent documents, to include one or more than one. In this document, the term "or" is used to refer to a nonexclusive or, unless otherwise indicated.

As used throughout this application, the word "may" is used in a permissive sense (e.g., meaning having the potential to), rather than the mandatory sense (e.g., meaning must). Similarly, the words "include", "including", and "includes" mean including but not limited to. To facilitate understanding, like reference numerals have been used, where possible, to designate like elements common to the figures.

Vehicle purchases may be envisioned as having a lifecycle. For example, a buyer may first research potential purchases, then identify candidates, and finally arrive at a purchase decision. After purchase of the vehicle, other portions of the lifecycle develop, such as insurance, maintenance, and eventual disposal of the vehicle, such as by way of sale. Each of the phases of the lifecycle may include a wide variety of decision points and other aspects. For example, during research, various vehicle features may be considered, such as the vehicle's fuel mileage, safety ratings, cost, and reliability. During identification, vehicles may be filtered to reduce the number being considered or configured to more specifically evaluate costs. In many cases, a potential buyer may research a sector or segment of vehicles, identify a subset of candidates, and then perform further research on the subset of vehicles. This type of research and identification may continue until the point of purchase.

Individuals value a variety of criteria when researching and identifying vehicles to purchase. For example, some users consult their social networks for input regarding a potential purchase. Additionally, a user may want to know if a vehicle will fit in with his or her present or future lifestyle. Individuals consult multiple sources of information to help make a purchase decision. These sources may include, but are not limited to, social networks, vehicle sales data, and insurance data.

In an electronic medium, a "social network" is a digital platform (e.g., website) that allows users to establish virtual connections with other users of the social network, and publish information to the social network. Published information may take many forms including, but not limited to, text, pictures, videos, links to websites, purchase information, reviews, and location information. Some social networks do not require a user to be connected to other users in order to publish information. A social network may also be accessible and updatable by mobile devices. For example, a user of a social network may publish information to the social network website via Short Messaging Service (SMS) or Multimedia Messaging Service (MMS).

What is needed is a system to evaluate the information available on social networks, vehicle sales data, and insurance data to determine if a vehicle is a proper fit for a user. In some instances, users may wish to blend in with a certain demographic. For example, a 40-year-old male high school teacher may want to buy a car that is similar to cars that other 40-year-old male teachers have bought or are driving. In contrast, other users may wish to purchase cars that are unique within their social networks or a specified geographic region. Thus, a uniqueness rating may be presented to the user that identifies how unique a vehicle is within a specified area, demographic, or both. The uniqueness rating may be a quantitative value (e.g., "75% unique" or a uniqueness score of 8, with 1 being common and 10 being unique) or a qualitative ranking (e.g., "very common" or "absolutely unique").

FIG. 1 is a schematic view of computer network system 100 according to various embodiments. Computer network system 100 includes vehicle uniqueness system 102 and user terminal 104, communicatively coupled via network 106. In an embodiment, vehicle uniqueness system 102 includes web server 108, application server 110, database management server 114, which is used to manage at least operations database 116, and file server 118. Vehicle uniqueness system 102 may be implemented as a distributed system, for example one or more elements of vehicle uniqueness system 102 may be located across a wide-area network from other elements of vehicle evaluation system 102. As another example, a server (e.g., web server 108, file server 118, or database management server 114) may represent a group of two or more servers, cooperating with each other, provided by way of a pooled, distributed, or redundant computing model.

Network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. Network 106 may include a single local area network (LAN) or wide-area network (WAN), or combinations of LAN's or WAN's, such as the Internet. Various devices coupled to network 106 may be coupled to network 106 via one or more wired or wireless connections.

Web server 108 may communicate with file server 118 to publish or serve files stored on file server 118. Web server 108 may also communicate or interface with application server 110 to enable web-based presentation of information. For example, application server 110 may consist of scripts, applications, or library files that provide primary or auxiliary functionality to web server 108 (e.g., multimedia, file transfer, or dynamic interface functions). In addition, application server 110 may also provide some or the entire interface for web server 108 to communicate with one or more of the other servers in vehicle uniqueness system 102 (e.g., database management server 114). Web server 108, either alone or in conjunction with one or more other computers in vehicle uniqueness system 102, may provide a user-interface. The user-interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

User terminal 104 may be a personal computer or mobile device. In an embodiment, user terminal 104 includes a client program to interface with vehicle uniqueness system 102. The client program may include commercial software, custom software, open source software, freeware, shareware, or other types of software packages. In an embodiment, the client program includes a thin client designed to provide query and data manipulation tools for a user of user terminal 104. The client program may interact with a server program hosted by, for example, application server 110. Additionally, the client program may interface with database management server 114.

Operations database 116 may be composed of one or more logical or physical databases. For example, operations database 116 may be viewed as a system of databases that when viewed as a compilation, represent an "operations database." Sub-databases in such a configuration may include a vehicle database, a vehicle sales database, insurance information database, and social network database. Operations database 116 may be implemented as a relational database, a centralized database, a distributed database, an object oriented database, or a flat database in various embodiments.

During operation, data from multiple data sources is imported into operations database 116. Data sources may exist within an organization, such as an sales department or insurance department or a subsidiary corporation, or exist at an external source, such as a social network website or a public record source. The data may be imported and stored in the operations database on a scheduled basis, such as weekly, monthly, quarterly, or some other regular or periodic interval. Alternatively, the data may be imported on-demand.

Internal sources may include insurance claim information and information from business partners. For example, the provider of the vehicle evaluation system may partner with a vehicle purchasing business. Sales data may be imported from the vehicle purchasing business. Information imported or obtained may represent past vehicle sales, vehicle characteristics (e.g., model, trim, and options), and insurance information (e.g., local, state, or national average insurance coverage and costs). Also, demographics (e.g., age, gender, occupation, location) of past purchasers or insured users may be imported. External sources may include social networks. Information that is published on social networks may be stored in the social network database. For example, a user might publish that he has just bought a 2008 Ford® Taurus®.

After data importation, the data may be standardized and then stored in a common database or data mart. For example, database records from business affiliates, internal or external sources may not be in a compatible format with the common database or data mart. Data conditioning may include data rearrangement, normalization, filtering (e.g., removing duplicates), sorting, binning, or other operations to transform the data into a common format (e.g., using similar date formats, name formats, and address fields).

Once imported and standardized, the data may be considered to be in a "raw" form. That is, the data accurately represents the source data, albeit reformatted or rearranged for the sake of compatibility and consistency. In an embodiment, the "raw" data is stored for a relatively long period of time, such as six months or several years. This persistent raw data storage may be useful for various purposes, such as data backup and restore, data auditing, or data modeling. In an embodiment, the persistent raw data is stored using a moving window of data. For example, an administrative user may define a window size of six months. When new data is saved in the persistent raw data, data older than the window size may be expunged from the persistent raw data storage. In an embodiment, multiple window sizes are used and each window size may be associated with a particular data. For example, insurance data may be stored using a window size of five years, while sales data may be stored using a window size of two years. The retention period may be configurable by a user of vehicle uniqueness system 102, or adjusted automatically by vehicle uniqueness system 102.

Figure 2:
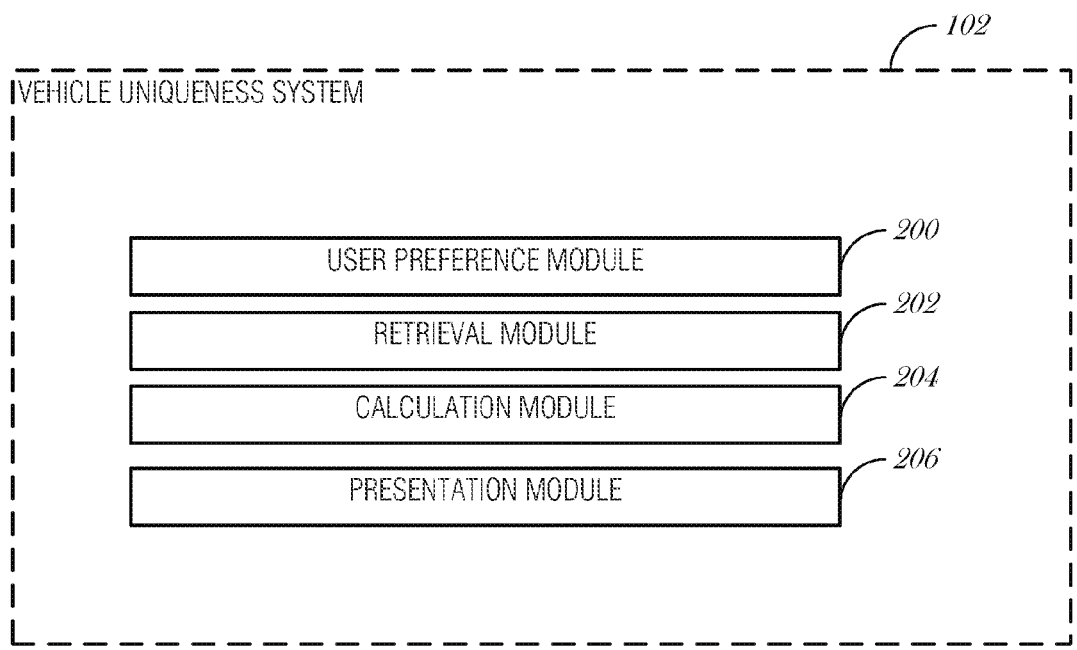
FIG. 2 is a block diagram illustrating modules of the vehicle uniqueness system shown in FIG. 1 according to various embodiments.

FIG. 2 is a block diagram of modules of vehicle uniqueness system 102 shown in FIG. 1, according to various embodiments. The modules include user preference module 200 to receive user preference data for calculating a uniqueness rating of a vehicle, retrieval module 202 to retrieve vehicle characteristics for a set of vehicles, calculation module 204 to calculate a uniqueness rating for the vehicle, and presentation module 206 to present the uniqueness rating to the user.

User preference module 200 receives user preference data for calculating a uniqueness rating of a vehicle. In an embodiment, a webpage is transmitted to a user terminal over a network (e.g., user terminal 104). The webpage includes graphical user interface elements (e.g., checkboxes, text boxes, combo boxes, radio buttons, and drop-down menus) that are displayed on a display device of the user terminal. A user may interact with the graphical user interface elements to indicate his or her preferences for calculating the uniqueness score. The display may be non-touch, a capacitive touchscreen, or a resistive touchscreen. The display may also be used as an input interface when the display is a touchscreen. Other input interfaces include a keyboard, a stylus, gesture control, or voice control. Interaction with the graphical user interface (e.g., a user selecting a checkbox) are encapsulated in one or more data packets as user preference data and transmitted back to one or more servers of vehicle uniqueness system 102. In an example embodiment, the graphical user interface is part of a computer program stored locally on the user terminal. In another example embodiment, the graphical user interface is part of an internet based application hosted on, or interacting with, a social network.

Figure 3:
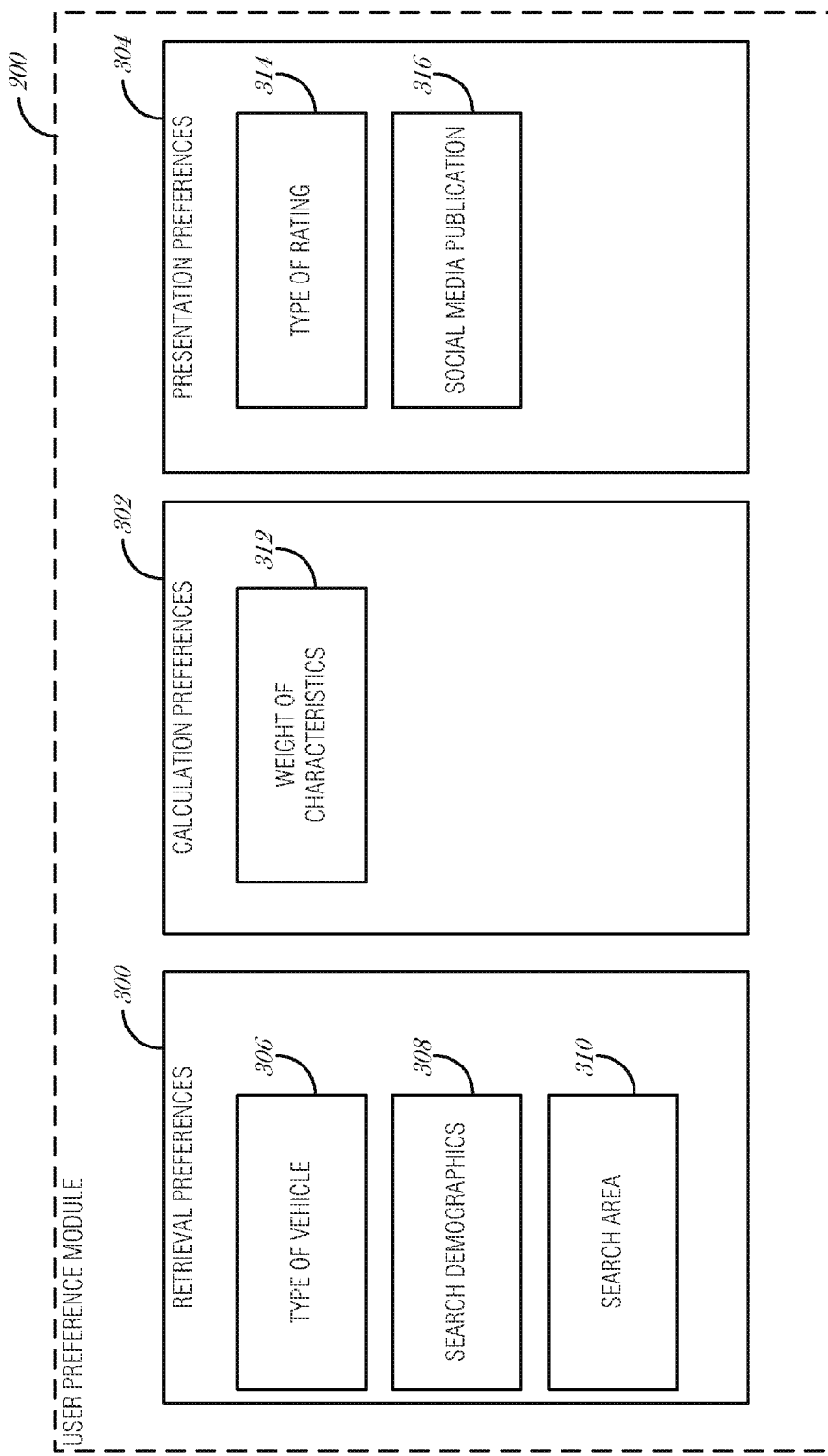
FIG. 3 is a block diagram of a user preference module according to various embodiments.

FIG. 3 is a block diagram of preferences that may be received by user preference module 200. The user preferences include retrieval preferences 300, calculation preferences 302, and presentation preferences 304. Retrieval preferences 300 relate to the criteria used in the calculation of the uniqueness rating. Calculation preferences 302 relate to weighting of the criteria in the calculation of the uniqueness rating. Presentation preferences 304 relate to mode and means of presenting information to the user (e.g., the resulting uniqueness rating). Labels given to the different categories of preferences and individual preferences are exemplary in nature and not intended to be limiting. In various embodiments, the categories of preferences may be separated, combined, or otherwise grouped as called for by a particular system design.

Retrieval preferences 300 include the type of vehicle preference 306 being researched, search demographics 308, and search area preference 310. Type of vehicle 306 may include characteristics of the vehicle including the make, model, trim, year, color, and options (e.g., navigation system, sports package). In various embodiments, a user may be presented with multiple drop-down menus that are populated with year, make, model, and trim of various vehicles. When a user has selected a year, make, model, and trim, multiple checkboxes may be displayed that identify options available for the selected vehicle. In an embodiment, the checkboxes are checked according to the most popular options for the selected vehicle. If the user has already purchased a car, and the vehicle uniqueness system has access to the vehicle characteristics, the vehicle uniqueness system may automatically fill in the corresponding graphical user interface elements.

The vehicle uniqueness system uses the search demographics 308 and search area 310 preferences to control the search domain. Users of the system may enter search demographics, search area, or both.

In an embodiment, search demographics 308 include categories of gender, race, age, income, disability, occupation, educational level, employment status, and geographic location. A user is presented with one or more demographic categories on his or her user terminal. In an embodiment, the demographic preferences are presented in a series of ranges. For example, age may be presented as a drop-down menu with ranges of "16-25," "26-34," "35-45," "46-55," "56-64," and "65 and older." A user does not need to fill in all of the demographic information presented.

In an embodiment, the search demographic categories are used as part of the basis for the uniqueness rating. For example, if a user enters age and occupation data, vehicle characteristics will be retrieved for drivers with the age and occupation entered. If the user has already purchased a car, and the vehicle uniqueness system 102 has access to the vehicle characteristics, the vehicle uniqueness system may automatically fill in the search demographics 308 graphical user interface with the demographics of the user. In an embodiment, the search demographics 308 do not need to correlate with the demographics of the user.

In an embodiment, search area preference 310 includes two sub-preferences: (1) geographic location; and (2) social network. Generally, a user will only enter information in one of the two sub-preferences. If a user enters information in both, two uniqueness ratings may be calculated and presented to the user. The geographic location preference may include differing levels of granularity. For example, the geographic location may include options to search within a zip code, city, metropolitan area, county, state, or country.

In an embodiment, the social network preferences allows users to identify one or more social networks that are to be used as the search area when calculating the uniqueness rating. Social networks take many forms, but generally they are defined by the ability for one individual to make a connection with another individual. For example, in a social network focused on reviews, a first user may be able to only view reviews made by a second user when the first user "follows" the second user.

Figure 4:
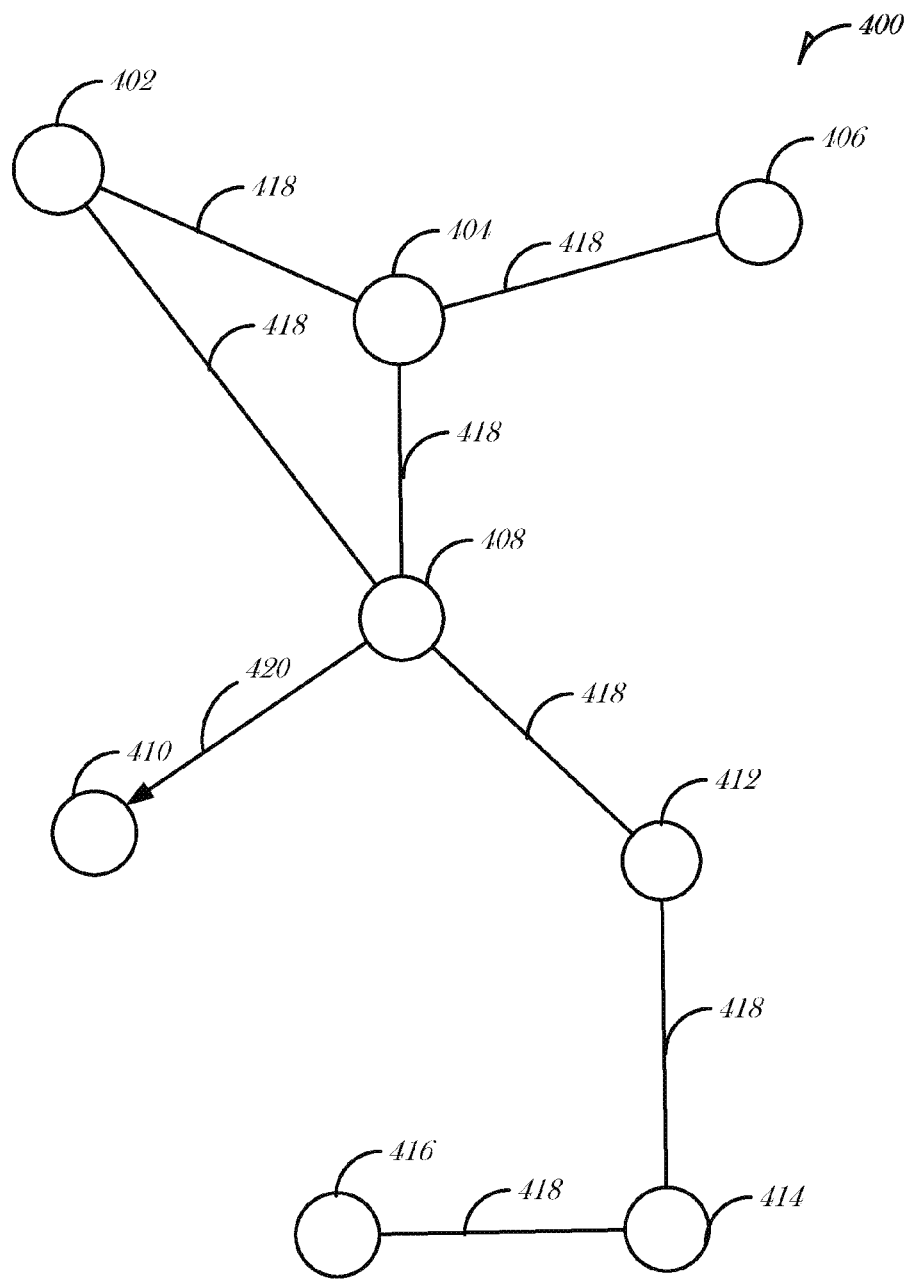
FIG. 4 is a social network graph according to various embodiments.

FIG. 4 illustrates example social network graph 400. From an organizational viewpoint, users in a social network are considered nodes or vertices in a graph. The connections between the users are edges. Edges may be unidirectional or bidirectional. A unidirectional edge indicates a relationship between the source node to the destination node, but not the inverse. A bidirectional edge indicates a bidirectional relationship between the two nodes at each end of the edge.

FIG. 4 illustrates a social network graph with nodes 402, 404, 406, 408. 410, 412, 414, 416 connected by edges 418 and 420. Using node as 408 as a reference point, nodes 404, 410, and 412 are connected to node 408. As illustrated, node 408 is connected to node 410 in one direction only, through unidirectional edge 420. Social networks often allow a user to "follow" another user without the other user reciprocating. Given a starting reference node, users represented as other nodes, can be categorized according to levels. Levels are defined as the minimum number of edges between two nodes. For example, nodes 404, 410, and 412 are one level away from node 408, and thus are considered first level "friends" of node 408. Similarly, nodes 406 and 414 are second level "friends" of node 408. Even though node 410 is a first level friend of 408, node 408 is not a first level friend of node 410 due to the directed nature of edge 420.

Referring back to FIG. 3, a user may indicate a preference of how far, as defined by levels, to traverse each social network identified by the user. In an embodiment, a user may specify different levels of traversal for different social networks. Vehicle uniqueness system 102 may perform a check to see if login information for a social network is stored in one or more of the databases of the system 102. If the login information is not stored, system 102 may prompt the user for his or her login credentials. In various embodiments, a user may indicate a specific group of friends to search. For example, the user may belong to a car enthusiast group on the social network, and may want to limit the search to members of the car enthusiast group.

FIG. 3 illustrates calculation preferences 302 that includes weight of characteristics preference 312. The weight of characteristic preference 312 allows users to weight various vehicle characteristics, thus providing an inference to value of each characteristic when calculating a vehicle's uniqueness. The weighting preference may be inputted using a variety of methods. For example, a number field may be displayed next to each vehicle characteristic that a user may enter a numerical value into (e.g., any number one to five). The number indicates the relative importance of that characteristic as compared to other characteristics. In an embodiment, a default value (e.g., three) is provided for each vehicle characteristic and a user may then adjust one or more characteristics' weights according to the user's interests. Another input mechanism is a drop-down menu with qualitative measurements of importance (e.g., "very important" or "not important"). In an embodiment, the user may indicate that a vehicle characteristic is not to be used in calculating the uniqueness rating.

FIG. 3 further illustrates presentation preferences 304, including type of rating preference 314 and social media publication preference 316. Type of rating preference 314 includes a user preference designating how the user wants the uniqueness rating to be displayed. In an embodiment, the user is given a choice between a quantitative rating or a qualitative rating. A quantitative presentation of the uniqueness rating may include either a percentage match or a number within a range. For example, the uniqueness rating may be displayed as a 52% unique rating or as a six out of ten uniqueness rating, respectively. The social media preference 316 is a preference that indicates if the user wants to publish an update on one or more of the user's social networks. In addition to or in the alternative to publishing a uniqueness rating of a vehicle, other information may be published. For example, if the user indicates the vehicle being researched has already been bought by the user, the vehicle uniqueness system may publish details of the purchase (e.g., "User A has just bought a 1996 Honda® Civic®") or video of the vehicle to one or more social networks.

Referring back to FIG. 2, retrieval module 202 retrieves vehicle characteristics for a set of vehicles. Retrieval module 202 uses the user preference data to generate the set of vehicles to be analyzed and compared to the user specified vehicle. Initially, the set of vehicles is taken from a pool of vehicles that the system has determined a driver for. Then, the set of vehicles may be filtered according to the user preference data (e.g., FIG. 3, items 300, 302, 304). As discussed, the system stores vehicle information gathered from a number of sources. While it may not always be possible to determine an actual driver of a vehicle, insurance data, purchase data, and social network data provide a presumption that the named insured, purchaser, or user of a social network is the driver. In an embodiment, when a vehicle is determined to have two different drivers, the system uses the most recent driver data available. In an example embodiment, the user preference data may indicate the vehicle being researched is a 2006 Honda® Civic®. In this example, the user preference data does not indicate a trim level or any other options. Therefore, the vehicle uniqueness system 102 does not retrieve any vehicle characteristics beyond year, make, and model from the set of vehicles (e.g., the vehicle characteristics are limited according to the user preference data).

In some embodiments, the information has not been stored in the databases and is retrieved on-the-fly from one or more external sources related to vehicle purchase data. For example, if the search area includes a social network, the vehicle uniqueness system 102 may not have any stored information on the user's social graph. The system 102 may traverse one or more levels of the user's social graph and use textual analysis to determine vehicles purchased by friends in the user's social graph. In an embodiment, the vehicle uniqueness system uses an application programming interface (API) of the social network to directly retrieve information on vehicles driven or purchased by friends of the user. In an embodiment, the vehicle uniqueness system 102 includes an application to run on the social network that collects information on vehicles purchased by users of the social network. In an embodiment, the application collects information on vehicles reviewed, commented on, or driven by users of the social network. For example, as part of the installation process of the application, a user may be requested to enter in his or her current vehicle.

Calculation module 204 calculates a uniqueness rating of the vehicle identified by the user preference data. In an embodiment, the uniqueness rating is the sum of the results of a number of component calculations. Each component is a vehicle characteristic identified by the user to include in the uniqueness rating. In an embodiment, the closer the uniqueness rating is to one, the less unique the vehicle is in relation to the set of vehicles.

Each component calculation is multiplied by a coefficient according to a weight characteristic preference. In an example embodiment, a user has given a weight of two to "make," a weight of five to "model," and a weight of three to "year." The coefficient for a component may be determined by taking the weight characteristic preference value for the component and diving it by the total of the given weight characteristic preferences. Using the example weights above, Uniqueness Rating=0.2(make)+0.5(model)+0.3(year).

If the weight characteristic data is a qualitative description, numerical values may be assigned to each description (e.g., "very important" may be assigned a value of five).

In an embodiment, a component calculation is determined according to the frequency of a vehicle characteristic in the set of vehicles. For example, if the vehicle is a Honda® Civic® vehicle the "make" component calculation will determine the number of Honda® vehicles in the set of vehicles. The set of vehicles is determined according to the user preference data and may be a smaller set of vehicles than is stored in the databases of the vehicle uniqueness system. Thus, assuming the set of vehicles includes 100 vehicles and 14 Honda® vehicles, the "make" component calculation is 0.14.

Presentation module 206 presents the uniqueness rating to the user based on the user preference data. In an example embodiment, a default presentation view (e.g., quantitative or qualitative) is used when the user does not specify a presentation preference. Presenting may take on many forms including, but not limited to, audio and visual presentations or a combination of audio and visual. As described previously, the presentation preferences include an option to receive the uniqueness rating in a quantitative or qualitative manner. If the user has selected the quantitative presentation option, a numerical value of uniqueness may be presented to the user (e.g., "Your vehicle is 85° % Unique.") In an embodiment, some of the underlying data used in the uniqueness rating calculation may be presented to the user (e.g., the frequency of a different vehicle characteristic occurring in the set of vehicles). Additional information may also be displayed related to the set of vehicles retrieved by the retrieval module. For example, the presentation module may display the most common make of car in set the of vehicles. FIG. 8 illustrates an example screen that may be presented to a user with the examples discussed above. In further embodiments, the presentation module may present the most common make in an auditory manner (e.g., playing an audio track announcing the most common make).

If the user has selected the qualitative presentation option, the uniqueness rating may be categorized according to a predefined set of ranges. For example, if the uniqueness rating is higher than 0.8, the vehicle may be classified as mostly unique. The presentation module also publishes data to social networks according to the social media publication preference 316.

Figure 5:
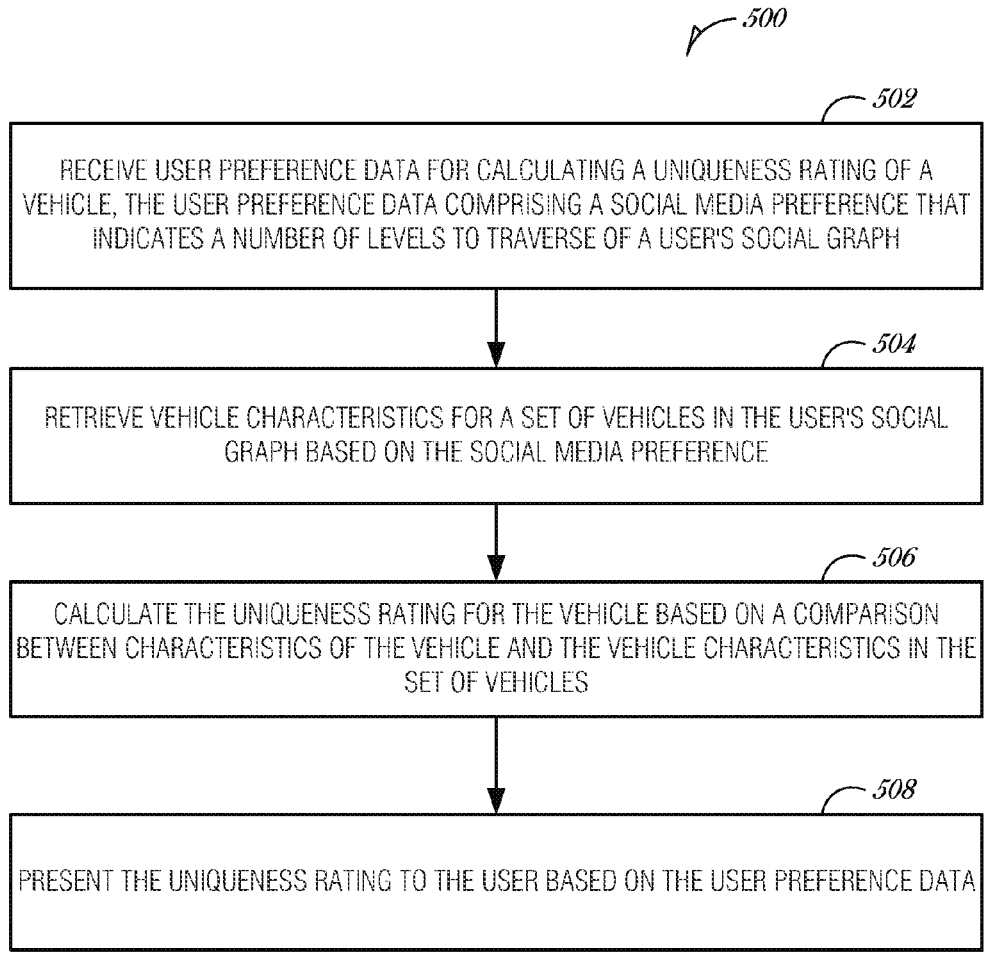
FIGS. 5-6 are flowcharts illustrating methods according to various embodiments.

FIG. 5 is a flowchart illustrating a method 500 according to various embodiments. At block 502, user preference data is received for calculating a uniqueness rating of a vehicle, the user preference data comprising a social media preference that indicates a number of levels to traverse of a user's social graph. At block 504, vehicle characteristics are retrieved for a set of vehicles in the user's social graph based on the social media preferences. At block 506, the uniqueness rating is calculated for the vehicle based on a comparison between characteristics of the vehicle and the vehicle characteristics in the set of vehicles. At block 508, the uniqueness rating is presented to the user based on the user preference data.

Figure 6:
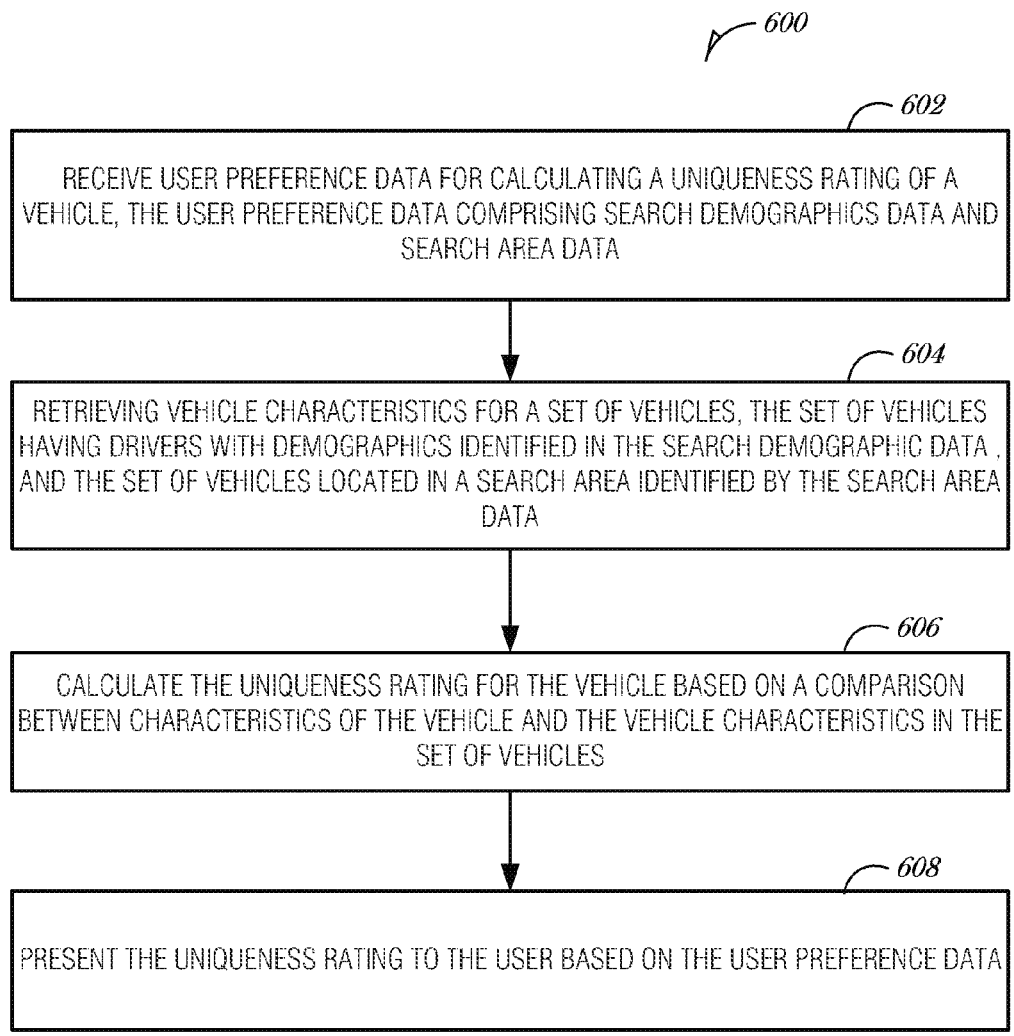

FIG. 6 is a flowchart illustrating a method 600 according to various embodiments. At block 602 user preference data is received for calculating a uniqueness rating of a vehicle, the user preference data comprising search demographics data and search area data. At block 604, vehicle characteristics are retrieved for a set of vehicles, the set of vehicles having drivers with demographics identified in the search demographic data, and the set of vehicles located in a search area identified by the search area data. At block 606, the uniqueness rating is calculated for the vehicle based on a comparison between characteristics of the vehicle and the vehicle characteristics in the set of vehicles. At block 608, the uniqueness rating is presented to the user based on the user preference data.

Example Hardware and Software Platform

Figure 7:
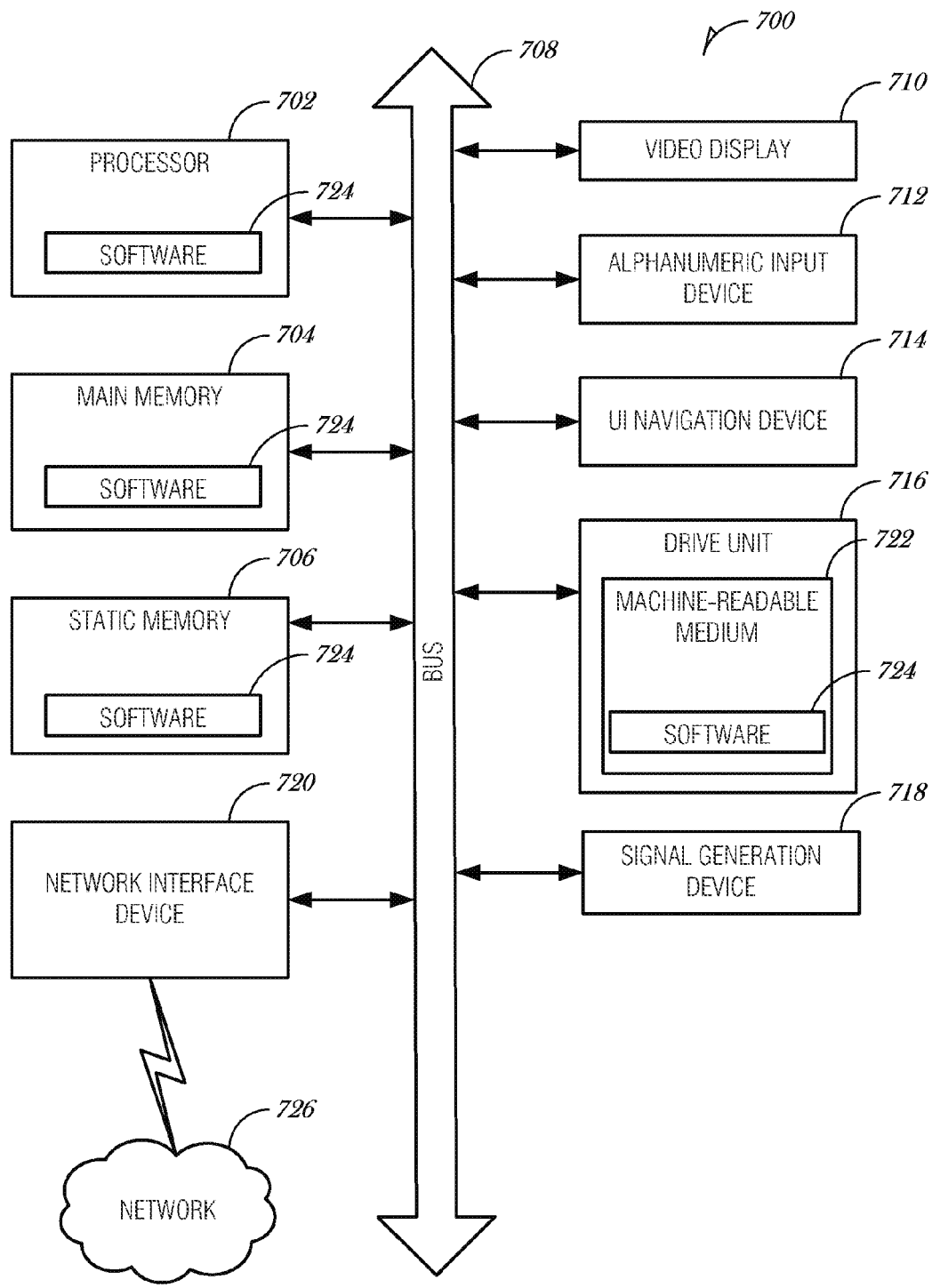
FIG. 7 is a block diagram illustrating a machine in the example form of a computer system, within which a set or sequence of instructions for causing the machine to perform any one of the methodologies discussed herein may be executed, according to various embodiments.

FIG. 7 is a block diagram illustrating a machine in the example form of computer system 700, within which a set or sequence of instructions for causing the machine to perform any one of the methodologies discussed herein may be executed, according to various embodiments. In alternative embodiments, the machine may comprise a computer, a network router, a network switch, a network bridge, Personal Digital Assistant (PDA), a cellular telephone, a web appliance, a kiosk, set-top box (STB) or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Computer system 700 includes processor 702 (e.g., central processing unit (CPU)), main memory 704 and static memory 706, which communicate via bus 708. Computer system 700 may further include video display unit 710 (e.g., liquid crystal display (LCD) or cathode ray tube (CRT)). Computer system 700 also includes alphanumeric input device 712 (e.g., keyboard), cursor control device 714 (e.g., mouse), disk drive unit 716, signal generation device 718 (e.g., speaker) and network interface device 720 to interface computer system 700 to network 726.

Disk drive unit 716 includes machine-readable medium 724 on which is stored a set of instructions or software 724 embodying any one, or all, of the methodologies described herein. Software 724 is also shown to reside, completely or at least partially, within main memory 704 and/or within processor 702. Software 724 may further be transmitted or received via network interface device 720.

While computer system 700 is shown with processor 702, it is understood that the systems and methods described herein can be implemented on one or more processors on one or more computer systems, including but not limited to a multi-processor computer (e.g., two or more separate processors or two or more cores in a single processor), a multi-computer system (e.g., a distributed computing environment), or a mixture of single-processor and multi-processor computers in a distributed fashion.

For the purposes of this specification, the term "machine-readable medium" or "computer-readable medium" shall be taken to include any tangible non-transitory medium which is capable of storing or encoding a sequence of instructions for execution by the machine and that cause the machine to perform any one of the methodologies described herein. The terms "machine-readable medium" or "computer-readable medium" shall accordingly be taken to include, but not be limited to, solid-state memories, and optical or magnetic disks. Further, it will be appreciated that the software could be distributed across multiple machines or storage media, which may include the machine-readable medium.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer-readable instructions for performing various methods. The code may form modules that operate as portions of computer program products. The modules may be executed on or more processors to perform the operations described herein. Further, the code may be tangibly (i.e. non-transitory) stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAM's), read only memories (ROM's), and the like.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. For example, one module may be implemented as multiple logical modules, or several modules may be implemented as a single logical module. As another example, separately named modules may be implemented in a single module, or in some combination of modules, as would be understood by one of ordinary skill in the art.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim.

What is claimed is:

1. A method for calculating a uniqueness rating for a vehicle comprising:
   receiving from a user, via a computing system with memory and a processor, user preference data for calculating the uniqueness rating of the vehicle, the user preference data comprising a social media preference that indicates a number of levels to traverse of the user's social graph, wherein the user's social graph is representative a friend of the user on a social media platform;
   retrieving vehicle characteristics for a set of vehicles in the user's social graph based on the received social media preference;
   calculating, via the processor, the uniqueness rating for the vehicle based on a comparison between characteristics of the vehicle and the vehicle characteristics in the set of vehicles; and
   presenting the uniqueness rating to the user based on the user preference data.

2. The method of claim 1, wherein the vehicle characteristics retrieved are limited by the user preference data.

3. The method of claim 1, wherein the user preference data comprises data indicating the uniqueness rating is to be published on the social media platforms.

4. The method of claim 1, wherein the step of retrieving vehicle characteristics for the set of vehicles in the user's social graph based on the social media preferences comprises:
   retrieving make and model characteristics of vehicles in the set of vehicles.

5. The method of claim 1, wherein the step of calculating the uniqueness rating for the vehicle based on the comparison between characteristics of the vehicle and the vehicle characteristics in the set of vehicles comprises:
   determining a frequency of a vehicle characteristic of the vehicle in the set of vehicles.

6. The method of claim 5, wherein presenting the uniqueness rating to the user based on the user preference data comprises:
   displaying on a display device the frequency of the vehicle characteristics.

7. A method for calculating a uniqueness rating of a vehicle comprising:
   receiving from a user, via a computing system with memory and a processor, user preference data for calculating the uniqueness rating of the vehicle, the user preference data comprising a social media preference that indicates a number of levels to be traversed of the user's social graph, wherein the user's social graph is representative of an acquaintance of the user on a social media platform;
   retrieving vehicle characteristics for a set of vehicles in the user's social graph based on the received social media preference;
   calculating, via the processor, the uniqueness rating for the vehicle based on a comparison between characteristics of the vehicle and the vehicle characteristics of the set of vehicles; and
   presenting the uniqueness rating to a user based on the user preference data.

8. The method of claim 7, wherein the vehicle characteristics retrieved are limited by the user preference data.

9. The method of claim 7, wherein user preference data comprises data indicating the uniqueness rating is to be published on the social media platform.

10. The method of claim 7, wherein the step of retrieving vehicle characteristics for the set of vehicles comprises:
    retrieving make and model characteristics of vehicles in the set of vehicles.

11. The method of claim 7, wherein the step of calculating the uniqueness rating for the vehicle based on the comparison between characteristics of the vehicle and the vehicle characteristics of the set of vehicles comprises:
    determining a frequency of a vehicle characteristic of the vehicle in the set of vehicles.

12. The method of claim 11, wherein presenting the uniqueness rating to the user based on the user preference data comprises:
    displaying on a display device the frequency of the vehicle characteristic.

13. A non-transitory computer-readable medium comprising instructions for calculating a uniqueness rating of a vehicle, which when executed by at least one processor, cause the at least one processor to:
    receive user preference data from a user, for calculating the uniqueness rating of the vehicle, the user preference data comprising a social media preference that indicates a number of levels to traverse of the user's social graph, wherein the user's social graph is representative of people, including the user, that follow other people's social feeds on a social media platform;
    retrieve vehicle characteristics for a set of vehicles in the user's social graph based on the received social media preference;
    calculate the uniqueness rating for the vehicle based on a comparison between characteristics of the vehicle and the vehicle characteristics in the set of vehicles; and
    present the uniqueness rating to the user based on the user preference data.

14. The non-transitory computer-readable medium of claim 13, wherein the vehicle characteristics retrieved are limited by the user preference data.

15. The non-transitory computer-readable medium of claim 13, wherein the user preference data comprises data indicating the uniqueness rating is to be published on the social media platform.

16. The non-transitory computer-readable medium of claim 13, wherein the instructions to retrieve vehicle characteristics for the set of vehicles in the user's social graph based on the social media preferences comprise instructions to:
    retrieve make and model characteristics of vehicles in the set of vehicles.

17. The non-transitory computer-readable medium of claim 13, wherein the instructions to calculate the uniqueness rating for the vehicle based on the comparison between characteristics of the vehicle and the vehicle characteristics in the set of vehicles comprise instructions to:
    determine a frequency of a vehicle characteristic of the vehicle in the set of vehicles.

18. The non-transitory computer-readable medium of claim 17, wherein the instructions to present the uniqueness rating to the user based on the user preference data comprise instructions to:
    displaying on a display device the frequency of the vehicle characteristics.

19. A system for calculating a uniqueness rating of a vehicle comprising:
    a computer with memory and a processor;
    a user preference module, running on the computer, to receive user preference data from a user for calculating the uniqueness rating of the vehicle, the user preference data comprising a social media preference that indicates a number of levels to traverse of the user's social graph, wherein the user's social graph is representative of at least one relationship between the user and other people on a social network;
    a retrieval module to retrieve vehicle characteristics for a set of vehicles in the user's social graph based on the social media preference;
    a calculation module to calculate, via the computer's processor, the uniqueness rating for the vehicle based on a comparison between characteristics of the vehicle and the vehicle characteristics in the set of vehicles; and
    a presentation module to present the uniqueness rating to the user based on the user preference data.

20. The system of claim 19, wherein the vehicle characteristics retrieved are limited by the user preference data.

21. The system of claim 19, wherein the user preference data comprises user preference data indicating the uniqueness rating is to be published on the social network.

22. The system of claim 19, wherein the retrieval module retrieves make and model characteristics of vehicles in the set of vehicles.

23. The system of claim 19, wherein the calculation module determines a frequency of a vehicle characteristic of the vehicle in the set of vehicles.

24. The system of claim 23, wherein the presentation module is to display on a display device the frequency of the vehicle characteristics.

\* \* \* \* \*